3,375,236
MOISTURE CURABLE BICYCLOHEPTENYL
HALOSILANE COPOLYMERS
John F. Van de Castle, Westfield, Francis P. Baldwin, Summit, and Erving Arundale, Westfield, N.J., assignors to Esso Research and Engineering Company, a corporation of Delaware
No Drawing. Filed Nov. 5, 1964, Ser. No. 409,308
10 Claims. (Cl. 260—80.71)

This invention relates to novel moisture-curable polymers. More specifically, it relates to polymers containing a bicycloheptenyl halosilane and the method for producing moisture cured products thereof.

The polymerization of alpha olefins at low pressures is well known in the art. It has now been found that these alpha olefins can be copolymerized with a selected class of halosilanes to yield a material which cross links in the presence of $H_2O$ in the form, for example, of steam or moisture laden air. These copolymers have many varied uses. For example, ethylenehalosilane copolymers are useful as a pipe forming material or as covering for wire or cables. Terpolymers of ethylene, a higher alpha olefin, and the halosilane of this invention, are elastomeric and therefore are useful wherever synthetic rubbers find application. They are particularly suitable as ditch and reservoir liners since they can be inexpensively sprayed onto the surface to be coated, and after the solvent has evaporated the polymer will be cured by atmospheric moisture to provide a waterproof, weather resistant liner.

In particular, at least one $C_2$–$C_{10}$ alpha olefin is polymerized with the halosilane of this invention in the presence of a catalyst composed of a transition metal compound and an organometallic compound. The polymer product is then cross linked by being exposed to water vapor. When the halosilane is polymerized with only one alpha olefin, as for example ethylene alone, then at least about 75 weight percent of the polymer, preferably at least about 95 weight percent, should be composed of the alpha olefin. When the halosilane is polymerized with more than one alpha olefin, as for example, ethylene and propylene, the polymer should contain at least about 3 weight percent of each alpha olefin, and 20–95 weight percent of one of the alpha olefins. Thus for example a terpolymer of ethylene, propylene and halosilane could suitably contain 70 weight percent ethylene, 20 weight percent propylene and 10 weight percent halosilane. The halosilane should be present in the polymer to the extent of at least about 1 weight percent, preferably 3–20 weight percent.

The silane compound which is useful in the present invention is a bicycloheptenyl halosilane having the formula:

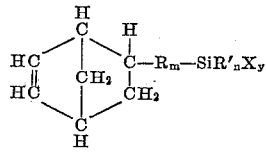

In this formula R is a $C_1$–$C_6$ hydrocarbon organic radical, i.e., alkyl, aryl, or cycloalkyl radical, such as methyl, propyl, or phenyl groups. R' can be hydrogen or a $C_1$–$C_6$ organic radical which may be the same or different from R. $m$ is any cardinal number between 0 and 6, preferably 0. $n$ is any cardinal number between 0 and 2, preferably 0. X is any halogen, such as chlorine or bromine, preferably chlorine. $y$ is any whole number between 1 and 3, preferably 3, such that $n+y$ is equal to 3.

Examples of suitable compounds include bicycloheptenyl dimethyl chlorosilane, bicycloheptenyl propyl dibromosilane, and bicycloheptenyl trichlorosilane, the last being the particuarly preferred species.

It should be noted that halosilane compounds which do not correspond to the above formula are not useful in the present invention. Thus for example bicycloheptenyl triethoxysilane and allyl trichlorosilane have been tried and have been found to be unsuitable as is shown in the data below.

The alpha olefin which is used in this invention has the general formula $R-CH=CH_2$ wherein R is hydrogen or a $C_1$–$C_8$ alkyl radical; preferably R is hydrogen or a $C_1$–$C_3$ alkyl radical. The alpha olefin may be linear or branched and either a single alpha olefin or mixtures of alpha olefins may be employed. Suitable examples of alpha olefins having the general formula $R-CH=CH_2$ include: ethylene, propylene, 1-butene, 1-pentene, 1-hexene, 1-heptene, 1-octene, 1-nonene, 1-decene, 4-methyl-1-pentene, 4-methyl-1-hexene, 5-methyl-1-hexene, 4,4-dimethyl-1-pentene, 4-methyl-1-heptene, 5-methyl-1-heptene, 6-methyl-1-heptene, 4,4-dimethyl-1-hexene, 5,6,6-trimethyl-1-heptene, 5,5-dimethyl-1-octene, 5-methyl-1-nonene and the like.

The catalyst system employed in preparing the copolymer of this invention comprises two components, namely, a catalyst and a cocatalyst. The catalyst is a reducible heavy metal compound such as a halide, acetonyl acetonate and the like of a metal of Group IV–b through VI–b and Group VIII of the Periodic System, e.g., of titanium, zirconium, vanadium, chromium, molybdenum and iron. See, e.g., Belgian Patent #533,362 and "Chemical and Engineering News," April 8, 1957, pages 12 through 16.

Suitabily, the catalyst may be selected from the group consisting of vanadium halides, vanadium oxyhalides, $C_1$–$C_5$ alkyl vanadates and $C_1$–$C_5$ alkylhalovanadates, wherein the halogen has an atomic number of at least 17, i.e., the halogen may be chlorine, bromine, or iodine, e.g., $VCl_4$, $VBr_4$, $VOCl_3$, $VOBr_3$, $VO(OCH_3)_3$,

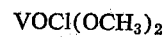

Particularly preferred herein are vanadium tetrachloride and vanadium oxychloride.

The cocatalyst employed in this invention comprises an organometal having the general formula $R'_nMX_y$, wherein R' is a monovalent hydrocarbon radical of 1 to 12 carbon atoms, M is a metal of Groups I–a, II–a, and III–a of the Periodic System, X is a halogen with an atomic number of at least 17, i.e., X may be chlorine, bromine, or iodine, $n$ is an integer of one to three inclusive, $y$ is a cardinal number of zero to two inclusive, and the sum of $n$ and $y$ is equal to the valance of the metal M. The Periodic System employed in describing the catalyst system of this invention is that which appears in "Merck Index," Merck & Co., Inc., Rahway, N.J., seventh edition (1960).

R', in the general formula above, may be the same or different (i.e., when $n$ is greater than one) monovalent hydrocarbon radicals. Examples of suitable R' groups include aryl radicals, aliphatic hydrocarbon radicals or derivatives, such as alkyl, cycloalkyl - alkyl, cycloalkenyl-alkyl, aryl - alkyl, cycloalkyl, aryl - cycloalkyl, cycloalkyl alkenyl, alkyl - aryl or cycloalkyl - aryl radicals.

Specific examples of R' groups for substitution in the above formula include methyl, ethyl, n-propyl, isopropyl, n-butyl, isobutyl, n-amyl, isoamyl, n-hexyl, n-octyl, n-decyl, and the like; 2 - butenyl, 2 - methyl - 2 - butenyl and the like; cyclopentyl - methyl, cyclohexyl - ethyl, cyclopentyl - ethyl, methylcyclopentyl - ethyl, 4 - cyclohexenylethyl, and the like; 2 - phenylethyl, 2 - phenylpropyl, α - naphthylethyl, methylnaphthylethyl, and the like; cyclopentyl, cyclohexyl, 2,2,1 - bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5 - cyclopentadienyl, and the like; phenylcyclopentyl, phenylcyclohexyl, the corresponding naphthyl derivatives of cycloalkyl groups, and the like; phenyl, tolyl, xylyl, ethylphenyl, naphthyl, methylnaphthyl, dimethylnaphthyl, ethylnaphthyl, cyclohexylphenyl, and the like.

Preferred as second components are the lower alkyl aluminum compounds, especially trialkyl aluminum compounds such as triethyl aluminum, tripropyl aluminum, triisobutyl aluminum, and the like, and the lower dialkyl aluminum compounds such as diethyl aluminum halides, e.g., diethyl aluminum chloride, dipropyl aluminum chloride, diisobutyl aluminum chloride, and the like. The lower monoalkyl alkyl aluminum halides, e.g., ethyl aluminum dichloride, can also be used. Additionally organo-aluminum compounds having one or more $C_1$ to $C_8$ hydrocarbon radicals and two or more electron-attracting groups such as alkoxy, organic nitrogen or sulfur groups can also be used. Particularly preferred herein are aluminum diethyl chloride and aluminum sesquichloride.

In practicing one embodiment of this invention, the components of the catalyst system, i.e., the catalyst and the cocatalyst are preferably mixed with an inert organic diluent prior to their use in the polymerization reaction; alternatively the components of the catalyst system may be mixed or added individually to the reactants in the absence of any diluents. Generally the molar ratio of the cocatalyst (the organometal compound) to the catalyst is in the range of 1:1 to 16:1, preferably 1.5:1 to 6:1. The total amount of catalyst employed in the polymerization reaction varies somewhat with the choice of the particular components of the catalyst system but is generally in the range of about 0.0005 to about 0.02 weight percent, preferably 0.001 to 0.01 weight percent, based upon the total reaction mixture.

The inert organic diluent for the catalyst system can also serve as the polymerization medium. Suitable examples of the diluent, which should be a liquid at the operating conditions of the polymerization reaction, include aliphatic hydrocarbons such as pentane, hexane, n-heptane, isooctane, and the like; cycloaliphatic hydrocarbons such as cyclopentane, cyclohexane, decahydronaphthalene, and the like; halogenated hydrocarbons such as methyl chloride, tetrachloroethylene, and the like; aromatic hydrocarbons such as benzene, toluene, ethylbenzene, xylene, tetrahydronaphthalene, and the like; halogenated aromatic hydrocarbons, e.g., mono- or dichlorobenzenes, and the like. Preferred is n-heptane. Although the concentrations of the catalyst components are not critical, sufficient amounts of the diluent are employed, such that the concentration of each component in the diluent is normally in the range of 0.1 to 10 g./l., preferably 0.5 to 5 g./l.

In preparing and using catalysts according to this invention, all steps should be carried out in the absence of oxygen, moisture, carbon dioxide or other harmful impurities. This may be readily accomplished by blanketing all the raw materials, i.e., the catalyst components, monomers, inert diluents, etc. with an inert gas such as dry nitrogen or argon. Electron donors such as amines, mercaptans, ketones, aldehydes etc. are generally poisonous to the catalyst system and it is generally desirable that the monomer contain less than about 200 p.p.m. and the diluent less than about 50 p.p.m. by weight of these impurities. Preferably all materials are purified, e.g., by drying, distillation, etc. prior to their use.

Generally, the polymerization reaction may be carried out in a temperature range of −40 to 150° C., although it is desirable to maintain a temperature range of 20 to 100° C. during the course of the reaction. As a matter of convenience, the polymerization reaction may be carried out at substantially atmospheric pressure; however, pressures as high as 1000 p.s.i. may be employed if desired. Reaction time may be between 5 minutes and 2 hours, preferably between 5 minutes and 1 hour.

A wide variety of compounding agents may be incorporated with these terpolymers at the time they are cured in order to improve various proporeties. Thus, they may be loaded with carbon black in order to increase the tensile strength. Other compounding agents well known to the art of processing elastomers, e.g., talc, silica, titanium dioxide, may also be added. Additionally, the polymers may be oil extended with such materials as paraffinic, aromatic and naphthenic oils or esters such as diisodecylphthalate.

It is often desirable to produce relatively low molecular weight polymers in this invention and for this purpose reducing or modifying agents can be added in controlled amounts to the polymerization reactor. These include such materials as hydrogen, HCl, and diethyl zinc.

The copolymers produced by this invention have a weight average molecular weight in the range of $10^3$–$10^6$.

The invention may be more fully understood by reference to the following examples. In the table below, the symbol $C_3$ refers to propylene, and the symbol $C_2$ refers to ethylene.

EXAMPLE 1

A 2-liter, 4-neck, glass reaction flask was fitted with a stainless steel agitator, thermometer, gas inlet and outlet tubes, and an opening to permit the introduction of liquid reagents. The flask was flushed with dry nitrogen and 1 liter of dry heptane was placed in the flask under nitrogen pressure. Alpha olefin monomers were metered through calibrated rotameters, passed through a 25 volume percent solution of aluminum triisobutyl in Primol D, mixed, and introduced into the reaction flask below the liquid level of the n-heptane. Primol D is a U.S.P. medicinal white oil which has a Saybolt viscosity of 360 seconds at 100° F. and a pour point lss than 10° F. The n-heptane was saturated with the alpha olefins at the rate of 3 liters/minute.

After a 20 minute period, the n-heptane was saturated with the alpha olefin monomer of mixtures thereof and the internal temperature of the reaction flask was adjusted to 25° C. The catalyst components described in Table I, were then added independently by a syringe to the saturated n-heptane; the aluminum compound and vanadium compound had previously been prepared as 0.15 M and 0.04 M solutions in n-heptane, respectively. The halosilane was then added to the reaction mixture and polymerization continued for 1 hour.

The catalyst was then deactivated by the addition of 20 ml. of isopropyl alcohol. The reaction mixture was then poured into 3 liters of an acetone-methanol mixture which contained 2 liters of acetone, 1 liter of methanol and 1 gram of 2,2′-methylenebis(6-tert.-butyl-4-methyl-phenol). The polymer was then separated and dried under vacuum at 50° F. (5 mm. Hg).

The catalyst components, reaction time and catalyst efficiency are tabulated in Table I below. It is to be noted that only the halosilanes of this invention produced polymer at rates which are commercially suitable.

TABLE I.—SILANE COPOLYMERS-POLYMERIZATION

| Run No. | Silane Component | Moles | Gas Feed | $VCl_4$, mmoles | Al/V | Yield, g. | Cat. Eff. | (a) %XLP |
|---|---|---|---|---|---|---|---|---|
| 1 | — | — | $C_2/C_3$, 70/30 | 0.355 | 4 | 41.5 | 606 | 0 |
| 2 | norbornene=(methylene) | 0.01 | $C_2/C_3$, 70/30 | 0.358 | 4 | 40.0 | 581 | 0 |
| 3 | norbornene–$SiCl_3$ | 0.01 | $C_2/C_3$, 70/30 | 0.358 | 4 | 22.3 | 325 | 93 |
| 4 | norbornene–$SiCl_3$ | 0.02 | $C_2/C_3$, 70/30 | 0.710 | 4 | 32.5 | 240 | 95+ |
| 5 | C=C—C—$SiCl_3$ | 0.05 | $C_2/C_3$, 70/30 | 0.352 | 5 | 10.1 | 150 | 49 |
| 6 | norbornene–$Si(OEt)_3$ | 0.01 | $C_2/C_3$, 70/30 | 0.359 | 4 | 0 | | |
| 7 | norbornene–$SiCl_3$ | 0.01 | $C_2$ | 0.185 | 4 | 17.8 | 500 | 99 |
| 8 | norbornene–$SiCl_3$ | 0.01 | $C_3$ | 0.355 | 4 | 38.4 | 560 | 98 |
| 9 | norbornene–$Si(CH_2)_3$ | 0.01 | $C_2/C_3$, 70/30 | 0.350 | 4 | 28.5 | 422 | 0 |
| 10 | norbornene–$Si(CH_3)_2Cl$ | 0.01 | $C_2/C_3$, 70/30 | 0.342 | 4 | 23.0 | 350 | 57 |

(a) %XLP=percent cross linked insolubilized polymer obtained after hydrolysis by exposure to moisture in a humidifier.
Cat. Eff.=Catalyst Efficiency=Gm. Polymer per gm. vanadium.

EXAMPLE 2

The vulcanizate characteristics of the halosilane terpolymer of Run No. 3 of Example 1 are here compared with a vulcanizate formed from the terpolymer of Run No. 2 (which doesn't contain a halosilane). A sheet was cast in a dry box from the polymer cement obtained from Run No. 3 and when all the solvent had evaporated the sheet was placed in the air space of a closed vessel containing water at 25° C. The other polymer was compounded with a curing recipe containing sulfur and then cured. R.T. in the table below stands for room temperature.

TABLE II.—VULCANIZATE PROPERTIES

| | Polymer | |
|---|---|---|
| | Halosilane Terpolymer | Other Terpolymer [a] |
| Compounding formulation | None | Polymer ——— 100<br>SRF ———<br>Stearic Acid — 1<br>ZnO ———— 5<br>Sulfur ———— 2<br>Altax ———— 1<br>Methyl Zimate _ 0.3 |
| Cure Conditions | 1 hr. at 25° C. and 100% Relative Humidity | 45′ at 307° F. |
| Tensile, p.s.i | 900 | 200 |
| Mod. at 100%, p.s.i | 250 | 125 |
| Elong., percent | 450 | 325 |
| Volume Swell, percent: Benzene, 24 hrs at R.T. | 75 | |

[a] Compounding recipe shown in parts by weight.

This invention has been described in connection with certain specific embodiments thereof; however, it should be understood that these are by way of example rather than by way of limitation, and it is not intended that the invention be restricted thereby.

What is claimed is:

1. A moisture curable copolymer of at least one $C_2$–$C_{10}$ alpha olefin with a halosilane of the formula:

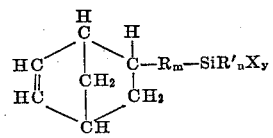

where R is a $C_1$–$C_6$ hydrocarbon organic radical; R' is selected from the class consisting of hydrogen and $C_1$–$C_6$ hydrocarbon organic radicals; X is a halogen; $m$ is a cardinal number between 0 and 6; $n$ is a cardinal number between 0 and 2; $y$ is a whole number between 1 and 3; and $n+y$ equals 3.

2. The copolymer of claim 1 wherein $m$ is equal to 0.
3. The copolymer of claim 2 wherein $n$ is equal to 0.
4. The copolymer of claim 3 wherein X is chlorine.
5. The copolymer of claim 1 wherein the alpha olefin is ethylene, said ethylene comprising at least 75 weight percent of the copolymer.
6. The copolymer of claim 1 wherein the halosilane is terpolymerized with ethylene and a $C_3$–$C_{10}$ alpha olefin, such that the terpolymer contains at least about 1 weight percent of halosilane, at least about 3 weight percent of the $C_3$–$C_{10}$ alpha olefin, and at least about 20 weight percent of ethylene.
7. The copolymer of claim 4 wherein the alpha olefin is ethylene, said ethylene comprising at least 75 weight percent of the copolymer.
8. The copolymer of claim 4 wherein the halosilane is terpolymerized with ethylene and propylene, such that the polymer contains at least about 1 weight percent of halosilane, and at least about 20 weight percent of ethylene.
9. The polymer of claim 8 which contains about 3–20 weight percent of halosilane.
10. The polymer of claim 9 which contains 70 weight percent ethylene, 20 weight percent propylene, and 10 weight percent halosilane.

References Cited

Natta et al.: J. Pol. Sci. 31, Issue No. 122 (1958), pp. 181–183.

Wagner et al.: Industrial Engineering Chemistry, vol. 45 (1953), pp. 367–374.

JOSEPH L. SCHOFER, *Primary Examiner*.